US011459345B2

(12) United States Patent
Cantwell et al.

(10) Patent No.: US 11,459,345 B2
(45) Date of Patent: Oct. 4, 2022

(54) METHOD FOR THE SYNTHESIS OF ASYMMETRIC POLYSULFIDES

(71) Applicant: The Goodyear Tire & Rubber Company, Akron, OH (US)

(72) Inventors: Kelsey Elizabeth Cantwell, Akron, OH (US); Joseph John Kulig, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/993,441

(22) Filed: Aug. 14, 2020

(65) Prior Publication Data

US 2022/0048933 A1  Feb. 17, 2022

(51) Int. Cl.
    *C07F 7/08* (2006.01)
(52) U.S. Cl.
    CPC .................. *C07F 7/0801* (2013.01)
(58) Field of Classification Search
    None
    See application file for complete search history.

(56) References Cited

U.S. PATENT DOCUMENTS

| | | | |
|---|---|---|---|
| 2,917,503 | A | 12/1959 | Daniels |
| 3,022,351 | A | 2/1962 | Mihm et al. |
| 3,703,505 | A | 11/1972 | Horodysky et al. |
| 4,191,659 | A | 3/1980 | Davis |
| 4,331,564 | A | 5/1982 | Kammann, Jr. et al. |
| 4,937,385 | A | 6/1990 | Buchholz et al. |
| 5,565,517 | A | 10/1996 | Efner et al. |
| 5,760,110 | A | 6/1998 | Zimmer et al. |
| 6,020,529 | A * | 2/2000 | Fremy ............ C07C 319/24 568/21 |
| 6,472,354 | B2 | 10/2002 | Luyendijk et al. |
| 10,131,860 | B2 | 11/2018 | Iba et al. |
| 2005/0197390 | A1 | 9/2005 | Byers et al. |
| 2014/0113993 | A1 | 4/2014 | Agostini et al. |
| 2019/0309097 | A1 * | 10/2019 | Couturier ............ B29B 11/10 |

FOREIGN PATENT DOCUMENTS

| | | |
|---|---|---|
| CN | 105713032 A | 6/2016 |
| CN | 104844772 B | 11/2017 |
| CN | 108097333 A | 6/2018 |
| FR | 2669042 A1 | 5/1992 |
| JP | 2009126836 A | 6/2009 |
| JP | 2010095482 A | 4/2010 |

OTHER PUBLICATIONS

Abbasi et al., One-pot efficient synthesis of disulfides from alkyl halides and alkyl tosylates using thiourea and elemental sulfur without contamination by higher polysulfides, Journal of the Iranian Chemical Society, Apr. 2013, pp. 201-205, 10(2), Springer Berlin Heidelberg.

Abu-Yousef et al., Preparation and reactivity of unsymmetrical di- and trisulfides, Journal of Sulfur Chemistry, 2006, pp. 15-24, 27(1), Taylor & Francis.

Abu-Yousef et al., Sulfenyl chloride chemistry. New precursors for diatomic sulfur transfer, Journal of Organic Chemistry, 1998, 8654-8660, 63(24).

Ando et al., Selective sulfurization of olefins by 9,10-epidithio-9,10-dihydroanthracene: intermediacy of diatomic sulfur, Tetrahedron, 1990, pp. 5093-5100, vol. 46, No. 15, Pergamon.

Arisawa et al., Rhodium-catalyzed sulfur atom exchange reaction between oranic polysulfides and sulfur, Tetrahedron Letters, 2005, pp. 4797-4800, 46(28).

Hanhela et al., Polysulfide Sealant Compositions. II. Interactions Between Elemental Sulfur and Organosulfur Compounds, Journal of Applied Polymer Science, Feb. 22, 1994, pp. 1441-1452, 51(8), John Wiley & Sons, Inc.

Harpp et al., Reaction of trialkyl phosphites with organic trisulfides. Synthetic and mechanistic aspects, Journal of Organic Chemistry, 1979, pp. 4140-4144, vol. 44, No. 23.

Khodade et al., Development of S-Substituted Thiisothioureas as Efficient Hydropersulfide Precursors, Journal of the American Chemical Society, 2018, p. 17333-17337, 140.

Kim et al., New synthesis of alkyl polysulfides by treatment of thiols, disulfides and thionitrites with anhydrous copper (II) chloride, Bulletin of the Chemical Society of Japan, 1979, pp. 3117-3118, vol. 52 (10).

Sato et al., Abstract of Product class 10: acyclic di- and polysulfides, Science of Synthesis, 2008, pp. 573-587, 39.

Valle et al., Sulfur fertilizer based on inverse vulcanization process with soybean oil, Polymer Degradation and Stability, 2019, pp. 102-105, 162.

Vasil'Eva et al., Abstract of Sulfur-containing heterocycles. 9. Reactions of 1,2-dithiolan-3-ones with amines, Bulletin of the Academy of Sciences of the USSSR Division of Chemical Science, Aug. 1981, pp. 1519-1524, 30(8).

Xiao et al., Polysulfurating reagent design for unsymmetrical polysulfdie construction, Nature Communications, 2018, pp. 1-9, 9:2191.

Xu et al., Research advances in organic sulfiding agents, Industrial Catalysis, Jun. 2014, pp. 416-421, vol. 22, No. 6, Huagongbu Xibei Huagong Yanjiuyuan.

Xu et al., Synthesis and thermal decomposition behavior of polysulfide olefins, Petroleum Processing and Petrochemicals, Dec. 2014, pp. 6-10, 45(12), Shiyou Lianzhi yu Huagong Zazhishe.

Xu et al., Synthesis of unsymmetric trisulfides from 9-fluorenylmethyl disulfides, Organic Letters, 2018, pp. 465-468, 20(2), American Chemical Society.

European Search Report for Serial No. EP21190429 dated Jan. 14, 2022.

* cited by examiner

*Primary Examiner* — Brian J Davis
(74) *Attorney, Agent, or Firm* — Mandy B. Willis; John D. DeLong

(57) ABSTRACT

The present invention is directed to a method of making an asymmetric polysulfide, comprising the step of simultaneously reacting an olefinically unsaturated compound, elemental sulfur, and a thiol in the presence of a catalytic amount of a base to produce the asymmetric polysulfide.

12 Claims, No Drawings

METHOD FOR THE SYNTHESIS OF ASYMMETRIC POLYSULFIDES

BACKGROUND

Soybean oil that is silylated through di- or polysulfide connectivity is of interest for use in rubber and tire compounds. The only method available for generating these types of materials is multi-step and not commercially viable, so development an alternative method is desirable.

Previous methods to produce polysulfides include vulcanization of olefins to create symmetric R—Sx-R polysulfides, using thiols to create symmetric R—Sx-R polysulfides, and using olefins to generate hydropersulfides (or hydropolysulfides). Methods for the synthesis of asymmetric polysulfides are not widely available and those that exist are typically multi-step and/or not commercially-viable.

SUMMARY

The present invention is directed to a method of making an asymmetric polysulfide, comprising the step of simultaneously reacting an olefinically unsaturated compound, elemental sulfur, and a thiol in the presence of a catalytic amount of a base to produce the asymmetric polysulfide.

DESCRIPTION

There is disclosed a method of making an asymmetric polysulfide, comprising the step of simultaneously reacting an olefinically unsaturated compound, elemental sulfur, and a thiol in the presence of a catalytic amount of a base to produce the asymmetric polysulfide.

An asymmetric polysulfide is a polysulfide that includes substitutent groups on opposite ends of the —$S_x$— polysulfide group that are different from each other, for example, in an asymmetric polysulfide such as Q1-$S_x$-Q2 the groups Q1 and Q2 are not the same.

The present invention is directed to a novel reaction that can generate asymmetric polysulfides in high yield and purity in a single step using a "one-pot" method under commercially accessible conditions. It is now found that if a mixture of olefin, elemental sulfur, thiol, and catalytic amount of base is heated at 170° C. for approximately 1 hour, the olefin can be functionalized to give a mixture of mono- and polysulfide products. The utility of this methodology is demonstrated on methyl oleate, high oleic soybean oil, commodity soybean oil, cis-cyclooctene, and squalene. The application to oils gives a new route to a wide variety of previously-unreported soybean oil derivatives. The application to squalene demonstrates the possible use of this method for functionalizing polymer backbones with polysulfides.

More broadly, the reaction mixture may be heated to a temperature range of 150 to 200° C., for a time ranging from 30 minutes to 2 hours.

By thiol, it is meant a compound including an —S—H group pendant from the compound. Such compounds may include other functional groups.

Most broadly then, in one embodiment the method of making an asymmetric polysulfide includes the step of simultaneously reacting an olefinically unsaturated organic compound, elemental sulfur, and a thiol in the presence of a catalytic amount of a base to produce the asymmetric poly sulfide.

The olefinically unsaturated organic compound may be derived from petroleum or from biological sources such as plants or microorganisms, or synthetically produced.

In one embodiment, the olefinically unsaturated organic compound is selected from the group consisting of alkenes, cycloalkenes, unsaturated fatty acid alkyl esters, and unsaturated fatty acid triglycerides.

In one embodiment, the olefinically unsaturated organic compound is a vegetable oil.

In one embodiment, the vegetable oil is soybean oil.

In one embodiment, the base is an amine. In one embodiment, the base is a tertiary amine, including but not limited to amines substituted with any combination of alkyl or aromatic substituents, amines contained within aromatic heterocycles, and fused ring amines such as bicycles (i.e. 1,4-diazabicyclo[2.2.2]octane). In one embodiment, the base is triethylamine.

In one embodiment, the asymmetric polysulfide is of formula 1

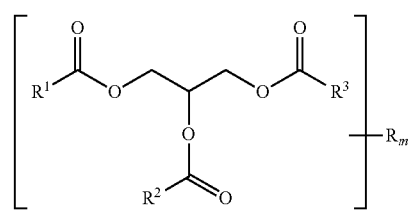

where $R^1$, $R^2$ and $R^3$ are independently C15-C20 alkenyl, C15-C20 alkyl, and optionally containing aromatic groups; R is —$S_x$—$R^4$ where x is an integer from 2 to 9, $R^4$ is a monovalent organic group; each R is covalently bonded to a carbon atom of one of $R^1$, $R^2$ or $R^3$; and m is the number of R groups. Each of the $R^4$ may be derived from a corresponding thiol $R^4$—S—H and such thiols may be used generally with an olefinically unsaturated organic compound, elemental sulfur in the presence of a catalytic amount of a base to produce the asymmetric polysulfide.

In one embodiment, $R^4$ is —$R^5$—Si—$(OR^6)_3$ where $R^5$ is C1 to C8 alkane diyl, and $R^6$ are independently C1 to C8 alkyl. In one embodiment, $R^4$ is —$CH_2$—Si—$(OCH_2CH_3)_3$ derivable from mercaptopropyltriethoxysilane.

In one embodiment, $R^4$ is selected from the following structures

where Z is a group that helps control the reactivity of the thiocarbonylthio moiety;

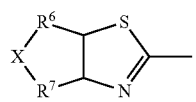

where X=0-2 carbon atoms; $R^6$, $R^7$ can be independently hydrogen, alkyl chains, or aromatic moieties;

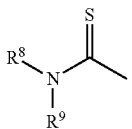

where $R^8$, $R^9$ can be independently alkyl or aromatic functionalities;

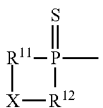

where $R^{10}$ is a substituted or non-substituted alkyl or aromatic group optionally containing ether, carboxyl, ester, amine, or amide functionalities;

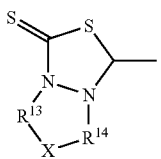

where X=0-2 carbon atoms; $R^{11}$, $R^{12}$ can be symmetric or asymmetric and independently be an alkyl, aromatic, or ethereal substituents;

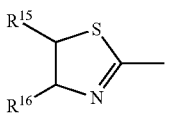

where X=0-2 carbon atoms; $R^{13}$, $R^{14}$ can be symmetric or asymmetric and are independently hydrogen, an alkyl chain, aromatic containing functional group;

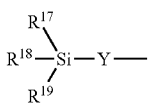

where $R^{15}$, $R^{16}$ can be independently hydrogen, alkyl chains, or aromatic moieties; and $$R^{18}-\underset{R^{19}}{\overset{R^{17}}{Si}}-Y-$$

where $R^{17}$, $R^{18}$, and $R^{19}$ are independently substituted or non-substituted alkyl or aromatic groups or substituted or non-substituted heteroatom-containing groups and Y is a substituted or non-substituted alkane diyl or aromatic group optionally containing ether, carboxyl, ester, amine, or amide functionalities. In one embodiment, at least one of $R^{17}$, $R^{18}$, and $R^{19}$ is —$N(R^{20})_2$ where $R^{20}$ is C1 to C8 alkyl. In one embodiment, at least one of $R^{17}$, $R^{18}$, and $R^{19}$ is —$OR^{21}$ where $R^{21}$ is C1 to C8 alkyl.

The following non-limiting examples further illustrate the method.

EXAMPLES

General Experimental

Soybean oil and high oleic soybean oil were generously supplied by Archer Daniels Midland. Elemental sulfur was obtained from Sigma Aldrich. 3-Mercaptopropyltriethoxysilane (MPTES) was purchased from TCI America, and triethylamine was purchased from Sigma Aldrich. Reactions were performed neat. NMR experiments were performed with a 400 MHz Varian instrument.

Example 1: Synthesis of Soy-Silane Polysulfide (Method A)

Soybean oil (1 eq, 3.0 g), elemental sulfur (2 eq vs olefins, 900 mg), and 3-mercaptopropyltriethoxysilane (1.2 eq vs olefins, 4.3 mL) were added to a 20 mL glass vial. The vial was sealed and stirred vigorously while heating to 170° C. Time was started when the bath temperature reached 120° C. The reaction was stirred for 40 minutes, at which point a deep red/orange transparent oil was obtained. NMR analysis confirmed the desired product, with a small amount of residual MPTES, which can be removed via vacuum distillation if desired.

Example 2: Synthesis of Soy-Silane Polysulfide (Method B)

Soybean oil (1 eq of olefins, 3.0 g), elemental sulfur (2 eq vs olefins, 900 mg), 3-mercaptopropyltriethoxysilane (1.2 eq vs olefins, 4.3 mL), and triethylamine (0.025 eq vs olefins, 47.1 µL) were added to a 20 mL glass vial. The vial was sealed and stirred vigorously while heating to 170° C. The reaction was stirred for 40 minutes at 170° C., at which point a dark red/orange oil was obtained. NMR analysis confirmed the desired product, with no residual MPTES detected.

Example 3: Synthesis of High Oleic Soy-Silane Polysulfide

High oleic soybean oil (1 eq of olefins, 5.147 g), elemental sulfur (2 eq vs olefins, 1.033 g), 3-mercaptopropyltriethoxysilane (1.2 eq vs olefins, 4.9 mL), and triethylamine (0.025 eq vs olefins, 55.8 µL) were added to a 20 mL glass vial. The vial was sealed and stirred vigorously while heating to 170° C. The reaction was stirred for 40 minutes at 170° C., at which point a bright orange oil was obtained. NMR analysis confirmed the desired product, with no residual MPTES detected.

Example 4: Synthesis of Methyl Oleate-Silane Polysulfide

Methyl oleate (1 eq, 5.0 g), elemental sulfur (2 eq, 1.033 g), 3-mercaptopropyltriethoxysilane (1.2 eq, 4.9 mL), and triethylamine (0.025 eq, 55.8 µL) were added to a 20 mL glass vial. The vial was sealed and stirred vigorously while heating to 170° C. Time was started when the bath temperature reached 120° C. The reaction was stirred for 40 minutes, at which point a bright orange oil was obtained. NMR analysis confirmed the desired product, with no residual MPTES detected.

Example 5: Synthesis of Cyclooctene-Silane Poly Sulfide

Cis-cyclooctene (1 eq, 1.77 g), elemental sulfur (2 eq, 1.033 g), 3-mercaptopropyltriethoxysilane (1.2 eq, 4.9 mL), and triethylamine (0.025 eq, 55.8 µL) were added to a 20 mL glass vial. The vial was sealed and stirred vigorously while heating to 170° C. Time was started when the bath temperature reached 120° C. The reaction was stirred for 40 minutes, at which point a bright orange oil was obtained. NMR analysis confirmed the desired product, with no residual MPTES detected.

Example 6: Synthesis of Squalene-Silane Polysulfide

Squalene (1 eq, 1.10 g), elemental sulfur (2 eq, 1.033 g), 3-mercaptopropyltriethoxysilane (1.2 eq, 4.9 mL), and triethylamine (0.025 eq, 55.8 µL) were added to a 20 mL glass vial. The vial was sealed and stirred vigorously while heating to 170° C. Time was started when the bath temperature reached 120° C. The reaction was stirred for 40 minutes, at which point a bright orange oil was obtained. NMR analysis confirmed the desired product, with no residual MPTES detected.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of making an asymmetric polysulfide, comprising the step of simultaneously reacting an olefinically unsaturated organic compound, elemental sulfur, and a thiol in the presence of a catalytic amount of a base to produce the asymmetric polysulfide;

the thiol being a compound including an —S—H group pendant from the compound.

2. The method of claim 1, wherein the olefinically unsaturated organic compound is selected from the group consisting of alkenes, cycloalkenes, unsaturated fatty acid alkyl esters, and unsaturated fatty acid triglycerides.

3. The method of claim 1, wherein the olefinically unsaturated organic compound is a vegetable oil.

4. The method of claim 1, wherein the olefinically unsaturated organic compound is soybean oil.

5. The method of claim 1, wherein the thiol is H—S—R5-Si—(OR6)3 where R5 is C1 to C8 alkane diyl, and R6 are independently C1 to C8 alkyl.

6. The method of claim 1, wherein the thiol is a mercaptopropyltriethoxysilane.

7. The method of claim 1, wherein the base is an amine.

8. The method of claim 1, wherein the base is a tertiary amine.

9. The method of claim 1, wherein the base is 1,4-diazabicyclo[2.2.2]octane.

10. The method of claim 1, wherein the asymmetric polysulfide is of formula 1

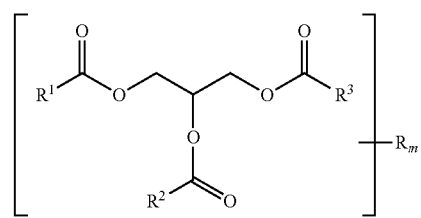

where $R^1$, $R^2$ and $R^3$ are independently C15-C20 alkenyl, C15-C20 alkyl, and optionally containing aromatic groups; R is —Sx-R4 where x is an integer from 2 to 9, R4 is a monovalent organic group; and each R is covalently bonded to a carbon atom of one of R1, R2 or R3.

11. The method of claim 10, wherein R4 is —R5-Si—(OR6)3 where R5 is C1 to C8 alkane diyl, and R6 are independently C1 to C8 alkyl.

12. The method of claim 10, where R4 is selected from the following structures

where Z is an electron withdrawing or electron donating group;

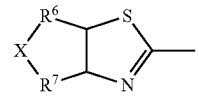

where X=0-2 carbon atoms; $R^6$, $R^7$ can be independently hydrogen, alkyl chains, or aromatic moieties;

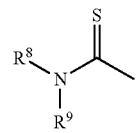

where $R^8$, $R^9$ can be independently alkyl or aromatic functionalities;

$R^{10}$— where $R^{10}$ is a substituted or non-substituted alkyl or aromatic group optionally containing ether, carboxyl, ester, amine, or amide functionalities;

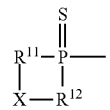

where X=0-2 carbon atoms; $R^{11}$, $R^{12}$ can be symmetric or asymmetric and independently be an alkyl, aromatic, or ethereal substituents;

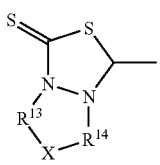

where X=0-2 carbon atoms; $R^{13}$, $R^{14}$ can be symmetric or asymmetric and are independently hydrogen, an alkyl chain, aromatic containing functional group;

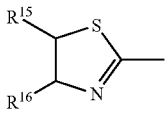

where $R^{15}$, $R^{16}$ can be independently hydrogen, alkyl chains, or aromatic moieties; and

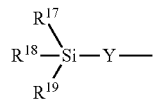

where $R^{17}$, $R^{18}$, and $R^{19}$ are independently substituted or non-substituted alkyl or aromatic groups or substituted or non-substituted heteroatom-containing groups and Y is a substituted or non-substituted alkane diyl or aromatic group optionally containing ether, carboxyl, ester, amine, or amide functionalities.

* * * * *